INVENTOR.
KASIMIR LANGROD

INVENTOR.
KASIMIR LANGROD

United States Patent Office 3,094,377
Patented June 18, 1963

3,094,377
METHOD FOR PRODUCING HIGH DENSITY URANIUM OXIDE
Kasimir Langrod, Sherman Oaks, Calif., assignor, by mesne assignments, to Sylvania Electric Products Inc., a corporation of Delaware
Filed Mar. 29, 1960, Ser. No. 18,292
6 Claims. (Cl. 23—14.5)

This invention relates to densification methods, and more particularly to a method for sintering a uranium oxide mass to nearly theoretical maximum density.

Uranium dioxide enjoys wide use as a nuclear reactor fuel element because of its dimensional stability during long irradiations and its compatibility with most liquid or gaseous coolants. It is also compatible with many sheathing materials including aluminum and stainless steel. Furthermore, uranium dioxide has a relatively high (2800° C.) melting point which allows high reactor burn ups.

While uranium dioxide is in many ways an ideal reactor fuel, it does have one serious defect. The content of uranium per unit volume in a uranium dioxide mass is only 51%. In the reactor art, it is important to keep the density of the fissionable atoms in a fuel compound as high as possible, in order to increase the capture of neutrons and thereby the efficiency of the chain reaction process. It has thus been a prime object in the art to densify uranium dioxide to at least 90% but preferably to over 95% of its theoretical density of 10.96 grams per centimeter cubed. Efforts toward this end have been further pressed because the denser uranium dioxide exhibits several other advantageous qualities, chief of these being better retention of the gaseous products of fission.

The art has developed a number of general approaches to the problem of densifying uranium dioxide, including hot pressing, warm pressing, and swaging. These methods have proved ineffective and uneconomical, and variations on cold pressing followed by sintering have been found to be the most feasible of the possible general approaches.

However, the sintering method of densifying uranium dioxide has heretofore been extremely expensive, particularly because of the high cold pressing pressures and high sintering temperatures required. A sintering temperature of at least 1650° C. has generally been used when densities of over 95% of theoretical were to be attained. In addition, cold pressing pressures of approximately 100 t.s.i. have generally been employed. It has long been realized that for each 100° C. lowering of the sintering temperature below 1700° C., there would be approximately a 50% saving in sintering costs. Also die cost is approximately proportional to the pressures employed. It has therefore been a prime object in the art to devise a compacting and sintering process for uranium dioxide that would produce a high quality densified mass with a minimum of steps and at the lowest pressure and temperature possible.

Various attempts at economically producing such a product at lowered temperatures and pressures have been made. Titanium dioxide has been used in sintering, but the lowering of the required temperature has not been appreciable. Steam sintering has been employed, as well as preparation techniques resulting in sub-micron size for the pre-compacted uranium dioxide. But all attempts to lower the sintering temperature and compacting pressure have resulted in excessively complicated and expensive procedures or have produced an inferior or cracked product.

The problem has been complicated by the fact that $UO_2$ is relatively unstable, being very easily oxidized to $U_3O_8$ upon contact with air. Stoichiometric $UO_2$, that is, where the oxygen atoms are exactly twice the number on the average of the uranium atoms, is highly desirable for fuel use over higher oxygen ratios because it has more uranium per unit volume, and has higher thermal conductivity and high retentivity of fission gases.

However, it has heretofore been difficult to attain a final product of exactly stoichiometric uranium dioxide, because somewhere in past processes oxidation has always been unavoidable. Thus the only way to attain stoichiometric uranium dioxide has been thought to be by starting with uranium dioxide of stoichiometric proportions, and proceeding carefully with the aforementioned expensive and inconsistently successful processes. And finally, stoichiometric uranium dioxide has been the most difficult to sinter, and the art has therefore heretofore considered lower sintering temperatures and a stoichiometric product as being mutually exclusive.

It is therefore an object of this invention to provide a method for densifying uranium oxide that results in a product in excess of 95% of theoretical maximum density.

It is a further object of this invention to provide a method for densifying uranium oxide that proceeds at a relatively low compacting pressure and a relatively low sintering temperature so as to be highly economical.

It is a further object of this invention to provide a method that economically produces a stoichiometric uranium dioxide product without cracks or other structural imperfections.

It is a still further object of this invention to provide a method that allows utilization of both commercial $U_3O_8$ and scrap oxidized $UO_2$ in combination with commercial $UO_2$ as raw materials in the manufacture of densified stoichiometric $UO_2$ at economical sintering temperatures and compacting pressures.

These and further objects will be more clearly understood from the detailed description and drawings which follow.

Briefly, the present invention contemplates mixing together commercially obtained $UO_2$ powder and uranium oxide powder of higher oxide ratio, the latter comprising either commercial $U_3O_8$ or oxidized scrap $UO_2$ which is always present as the unavoidable by-product of $UO_2$ handling, since $UO_2$ is so easily oxidized. The components are mixed in the proper proportions to give a certain ratio above stoichiometric that I have found to be of optimum sinterability.

This optimum sinterability mixture is then mixed with a binding agent for mechanical handling purposes, and is coated with a die lubricant. The mixture is then pressed at 5 to 10 t.s.i., which is a very small fraction of the 80 to 125 t.s.i. usually employed in a compaction step. Pressures over 10 t.s.i. may of course be used as shown in FIGURE 3, but the range of 5 to 10 t.s.i., and particularly the pressure of 10 t.s.i. give high economy with excellent density.

The compacted uranium oxide powder is then sintered. It has been found that good results are obtainable down to sintering temperatures as low as 1000° C., however an optimum product is attained at approximately 1300 to 1315° C. The compacted uranium oxide is soaked at that temperature in a nitrogen atmosphere for approximately 2 hours. The result of this stage of the process is a crack free densely sintered uranium oxide. However since stoichiometric uranium dioxide is highly desired, the two hour nitrogen soak is followed by approximately 10 minutes in a hydrogen forced atmosphere at the sustained temperature, during which time the uranium dioxide is reduced to stoichiometric. The product is then cooled slowly in hydrogen to avoid cracking or reoxidation.

The use of 5 to 10 t.s.i. instead of the 80 to 125 t.s.i.

of normal uranium oxide sintering processes reduces costs proportionally, that is to about one fifteenth for this phase of the process. The use of a 1300 to 1315° C. sintering temperature for 2 hours compared to the usual 1650 to 1700° C. sintering for 8 hours reduces furnace costs also to at least one fifteenth by the 100° C. doubling cost rule. Additionally the decreased time allows higher production or more economical furnaces.

Not only are tremendous savings accomplished by this process, but a highly controlled, uniform uncracked product is attained thereby, using much less expensive equipment and much less production time, as well as producing a uniformly stoichiometric product.

Figure 1:
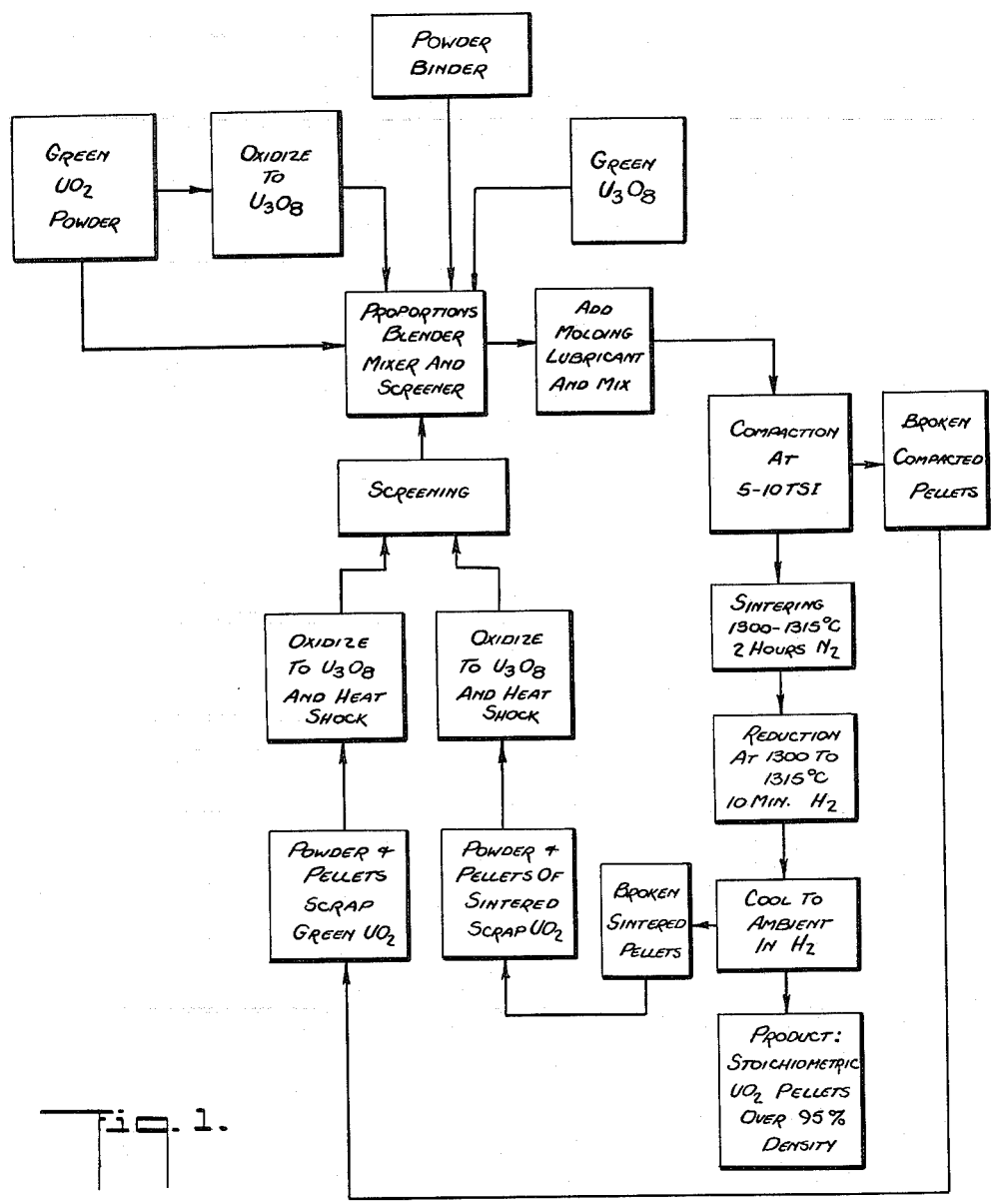
FIGURE 1 is a flow diagram indicating the steps in the practice of the invention.

Referring now to the drawings, I have found that non-stoichiometric uranium dioxide is much more easily sintered to any given percentage of theoretical density than is stoichiometric uranium dioxide. This information is conveyed by the graph of FIGURE 2, which shows the high sinterability of non-stoichiometric $UO_2$ for a sintering temperature of 1300° C. While I have found that temperatures as low as 1000° C. have similar high sinterability graphs at the higher O/U ratios, considerations of cracking, grain size and other physical characteristics of the finished pellets show the optimum sintering temperature for the present process to be approximately 1300° to 1315° C.

Figure 2:
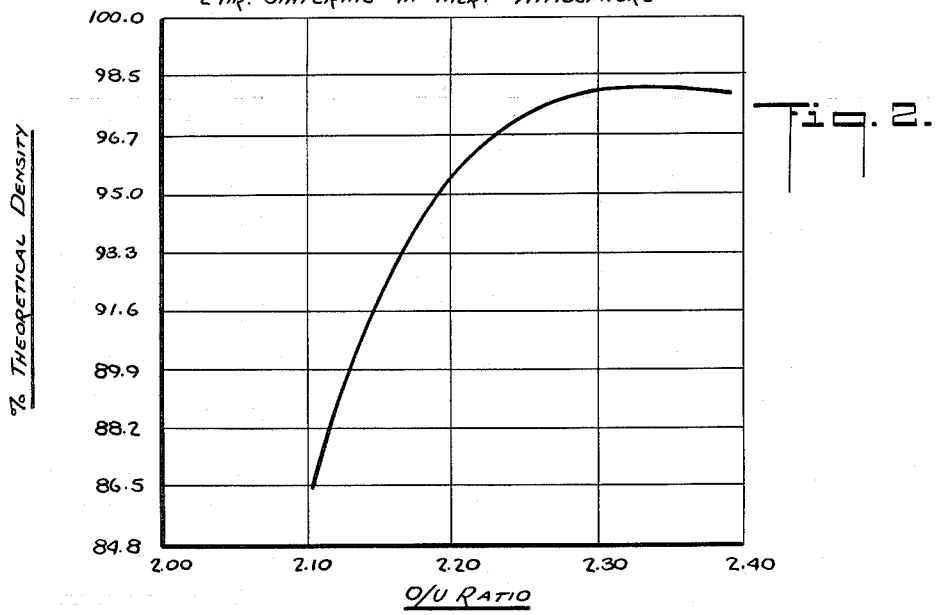
FIGURE 2 is a graphic presentation of the relationship of the oxide-uranium ratio to the percentage of theoretical density attainable for a given compaction pressure and given sintering conditions.

In FIGURE 2 then, which traces the O/U to theoretical density percent relationship, it is apparent that O/U ratios in the range of 2.20 to 2.40 give highly desirable results as to percent theoretical density attainable. The low temperature of 1300° to 1315° C. which FIGURE 2 traces is extremely economical when compared to the usual sintering processes in the 1650° C. range because among the other factors mentioned before, there is a halving of furnace costs for every 100° C. below 1700° C. And within the operable range of 1000° C. to 1400° C., the 1300° to 1315° C. product has been found to have the best physical characteristics.

Figure 3:
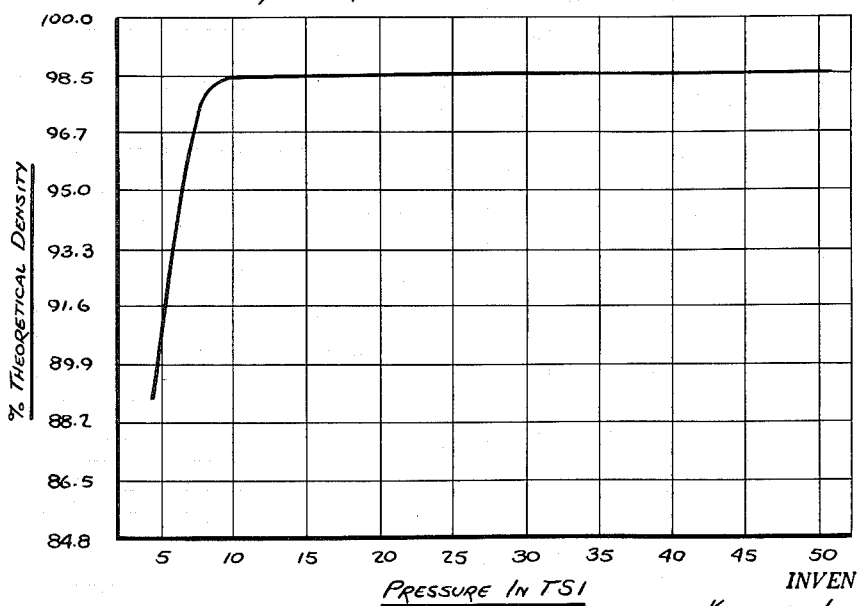
FIGURE 3 is a graphic presentation of the relationship of compacting pressure to the percentage of theoretical density attainable for a given oxide to uranium ratio and given sintering conditions.

Similarly it is apparent from an examination of FIGURE 3, that when the sintering process of the present invention is utilized, it is unnecessary to go to the customary high compaction pressure in the range of 100 t.s.i. The range of 5 to 10 t.s.i. is optimum for the process of the present invention, and results in very large economies in equipment and operating expense. 10 t.s.i. is the single optimum pressure.

In FIGURE 1 is illustrated a flow diagram showing the practice of the present invention. As mentioned before, uranium dioxide with a O/U ratio in the range of 2.20:1 to 2.40:1 is utilized, the graph of FIGURE 2 illustrating the characteristics of the intermediate mixture of 2.30:1. I have found that for purposes of sintering, it does not matter how the O/U ratio desired is attained, as long as the desired ratio is in fact the average ratio of all the molecules in the mixture. Thus any two oxides of uranium may be mixed in varying proportions so as to attain the proper average ratio of oxygen atoms to uranium atoms. As long as the mixture components are well dispersed, the present invention will be attainable with it.

Uranium dioxide powder of essentially stoichiometric proportions is obtainable commercially. In the prior art processes this was sintered directly. While the densified product was stoichiometric, the temperature needed to attain a high percentage of theoretical density has been high and uneconomical, in the range of 1650° C. In the present process this commercial stoichiometric $UO_2$ is mixed with $U_3O_8$ in known proportions to obtain any desired intermediate, as for instance a O/U ratio of 2.20:1.

In prior art processes, since only stoichiometric $UO_2$ was used as a raw material, there was no use for either broken sintered pellets or broken unsintered pellets and powder. Since $UO_2$ is easily oxidized, such scrap was always above stoichiometric and therefore not utilizable. While such scrap had commercial scrap value, it had no immediate process value for making sintered stoichiometric $UO_2$ pellets. However, in the present process, such scrap is oxidized to $U_3O_8$ and utilized along with $U_3O_8$ from other sources as a component of the non-stoichiometric $UO_2$ mixture.

In FIGURE 1 then, green or commercial $UO_2$ stoichiometric powder is oxidized to $U_3O_8$. I have found that an electric furnace operating for 2 hours at 700° C. with air or oxygen input will thoroughly complete the transformation of $UO_2$ to $U_3O_8$. Those skilled in the art will see many other commercial methods for transforming the $UO_2$ to $U_3O_8$. When the transformation is complete, it is desirable to grind and sieve it. A Stokes granulator with a 14 mesh screen, or other equipment capable of producing a similar homogeneous powder is used. It is useful at this stage to test the product to be sure the O/U ratio is known, and preferably stoichiometric $U_3O_8$.

The $U_3O_8$ is, by the present process, also obtainable from the processes' scrap. Thus as shown in FIGURE 1, the broken compacted pellets from the compaction step, and the broken sintered pellets from the sintering through the reduction steps, may be utilized to produce $U_3O_8$ raw material. The two forms of scrap are preferably reprocessed separately, since one is much denser than the other.

The scrap, of either kind, is roasted, preferably in an electric furnace at about 700° C. for one-half hour with air or oxygen access. The roasted scrap is suddenly removed and air cooled, then re-roasted. This is repeated several times, until all pellets have crumbled to powder. Any nodules of uranium oxide remaining in pellet form are then powdered by running all the scrap through a mixer and a Stokes granulator with a 100 mesh screen, or equipment capable of producing a similar product.

The scrap, oxidized and screened to $U_3O_8$ powder, is used alternatively with the $UO_2$ oxidized to $U_3O_8$ and with commercial $U_3O_8$. Any combination of these forms of $U_3O_8$ powder is then mixed in the proper proportions with the green or commercial $UO_2$ powder to attain the O/U ratio desired. Mixing from approximately 35% to 65% $UO_2$ by weight to the balance $U_3O_8$ will give the desired O/U ratio range of from 2.20:1 to 2.40:1.

In mixing, it is again useful to screen, at approximately 20 mesh, and add a binder simultaneously. I have used a commercial binder, Elvanol, of grade 51-05 as the binder, and add ½% by weight.

It is then useful to mix the blended powder once again, this time adding a moulding lubricant. I use a Stokes granulator or the equivalent, and add approximately 16% by weight distilled water. After thorough mixing, the material is dried and screened at 14 mesh, and ¼% by weight zinc stearate is added. This lubricant is then thoroughly tumbled onto the mixture in a twin shell blender.

It is apparent that the mixture at this stage could be made with $UO_2$ and $U_3O_8$ from various sources, and various binders and lubricators. The foregoing, while advantageous, are by way of example only.

For pellet manufacture, I prefer steel dies in the compaction step, though other devices may be employed. I prefer to press at from 5 to 10 t.s.i. for reasons of economy, as shown by FIGURE 3. The broken pellets and powder from compaction are recycled into the $U_3O_8$ raw product as previously explained. Compaction at 10 t.s.i. is optimum.

The compacted pellets are then sintered. While high densities are attainable from 1000° C. to 1400° C., for reasons of excellence of grain size, cracks, and other physical characteristics, I prefer to sinter at 1300° C. to 1315° C. The sintering is for 2 hours at the full temperature, in an inert atmosphere, preferably nitrogen. Although the details of furnace construction are not controlling so long as care is taken to prevent cracked pellets, I have found that pellets produced in stainless steel boats coated with aluminum oxide base powder do not stick to anything during sintering. Such boats can be passed through a furnace hot zone of uniform temperature on a flow basis in the prescribed time. The furnace should have provision for forced $N_2$ and $H_2$ atmospheres alternatively.

When the two hours have expired, the sintering in nitrogen is through, and the atmosphere is immediately switched to forced $H_2$ for 10 minutes of reduction. The sintered pellets are still appreciably above stoichiometric until this reduction step, but in the 10 minutes at sintering temperature, the $H_2$ reduces the pellets to stoichiometric. Since stoichiometric pellets are easily oxidized, it is desirable to let the reduced pellets cool to ambient in the $H_2$ atmosphere.

Any broken pellets at this point can be recycled into the $U_3O_8$ cycle as has been previously described.

The intact pellets will be above 95% of theoretical density, and will have high quality physical characteristics such as lack of surface cracks. They will also be in a highly desirable stoichiometric form, and will have been produced at great savings of cost and materials and equipment relative to prior art methods.

It will be apparent to those skilled in the art that variations in the steps and equipment may be practiced without departing from the scope of the invention as pointed out in the appended claims.

What is claimed is:

1. The method for producing densified stoichiometric uranium dioxide comprising compacting non stoichiometric uranium dioxide at 5 to 10 t.s.i., sintering the compacted uranium dioxide in a nitrogen atmosphere for approximately 2 hours at a temperature in the range of 1300° to 1315° C., and subjecting said sintered uranium dioxide to a forced hydrogen atmosphere for 10 minutes while still at said elevated sintering temperature.

2. The method for producing densified stoichiometric uranium dioxide comprising compacting non stoichiometric uranium dioxide at 5 to 10 t.s.i., sintering the compacted uranium dioxide in a nitrogen atmosphere for approximately 2 hours at a temperature in the range of 1300° to 1315° C., subjecting said sintered uranium dioxide to a forced hydrogen atmosphere for 10 minutes while still at said elevated sintering temperature, and allowing said sintered uranium dioxide to cool in said hydrogen atmosphere.

3. The method for producing densified stoichiometric uranium dioxide comprising compacting at 5 to 10 t.s.i. pressure uranium dioxide having an oxygen to uranium ratio in the range of from 2.20:1 to 2.40:1, sintering the compacted uranium dioxide in a nitrogen atmosphere for approximately 2 hours at a temperature in the range of 1300° to 1315° C., and subjecting said sintered uranium dioxide to a forced hydrogen atmosphere for 10 minutes while still at said elevated sintering temperature.

4. The method for producing densified stoichiometric uranium dioxide comprising mixing $UO_2$ powder and $U_3O_8$ powder so that the mixture contains from 35% to 65% $UO_2$ powder, compacting said mixture at 5 to 10 t.s.i., sintering the compacted uranium dioxide in a nitrogen atmosphere for approximately 2 hours at a temperature in the range of 1300° to 1315° C., and subjecting said sintered uranium dioxide to a forced hydrogen atmosphere for 10 minutes while still at said elevated sintering temperature.

5. The method for producing densified stoichiometric uranium dioxide comprising mixing $UO_2$ powder and $U_3O_8$ powder so that the mixture contains from 35% to 65% $UO_2$ powder, compacting said mixture at 5 to 10 t.s.i., sintering the compacted uranium dioxide in a nitrogen atmosphere for approximately 2 hours at a temperature in the range of 1300° to 1315° C., and subjecting said sintered uranium dioxide to a forced hydrogen atmosphere for 10 minutes while still at said elevated sintering temperature, and allowing said sintered uranium dioxide to cool in said hydrogen atmosphere.

6. The method for producing densified stoichiometric uranium dioxide comprising mixing $UO_2$ powder and $U_3O_8$ powder so that the mixture contains from 35% to 65% $UO_2$ powder, compacting said mixture at a pressure above 5 t.s.i., sintering the compacted uranium dioxide in a nitrogen atmosphere for approximately 2 hours at a temperature in the range of 1300° to 1315° C., and subjecting said sintered uranium dioxide to a forced hydrogen atmosphere for approximately 10 minutes while still at said elevated sintering temperature.

References Cited in the file of this patent

UNITED STATES PATENTS 2,991,601     Glatter et al. _____ July 11, 1961

FOREIGN PATENTS 801,381     Great Britain _____ Sept. 10, 1958

OTHER REFERENCES

Gronvold: "J. Inorg. and Nuclear Chem.," vol. 1, pp. 358, 359, 364–370 (1955).

Belle: AEC Document WAPD–PWR–PMM–904, p. 95, Dec. 3, 1956.

TID–7546, Book 2, pp. 384–400, 414–422, 434–439, 489, March 1958.

Murray: "Proceedings of the 2nd United Nations Conference on Peaceful Uses of Atomic Energy," vol. 6, pp. 538–540, Sept. 1–13, 1958.

"2nd United Nations Conf. on Peaceful Uses of Atomic Energy," vol. 6, Sept. 1–13, 1958: Chalder et al., pp. 590–604; Terraza et al., pp. 620–623.